United States Patent [19]

Cordner

[11] 4,315,442
[45] Feb. 16, 1982

[54] AIRCRAFT GENERATOR STARTER-DRIVE

[75] Inventor: Michael A. Cordner, Mount Morris, Ill.

[73] Assignee: Sundstrand Corporation, Rockford, Ill.

[21] Appl. No.: 122,147

[22] Filed: Feb. 15, 1980

[51] Int. Cl.³ ............................................. F16H 47/04
[52] U.S. Cl. ................................ 74/687; 123/179 AS; 123/179 R
[58] Field of Search ................. 74/687, 752 C; 123/3, 123/179 AS, 179 P, 179 R; 60/530

[56] References Cited

U.S. PATENT DOCUMENTS

| | | | |
|---|---|---|---|
| 3,274,855 | 9/1966 | Reynolds | 74/687 |
| 3,365,981 | 1/1968 | Gantzer | 74/687 |
| 3,786,696 | 1/1974 | Aleem | 74/687 |
| 4,046,029 | 9/1977 | Sugden | 74/687 |
| 4,252,035 | 2/1981 | Cordner | 74/687 |

Primary Examiner—Nile C. Byers, Jr.
Attorney, Agent, or Firm—Ted E. Killingsworth; Michael B. McMurry; Harold A. Williamson

[57] ABSTRACT

This invention relates to a hydraulic control system for an aircraft starter-drive mechanism that includes a generator that can be driven as a motor drivingly connected through a differential, which is mutually connected to first and second hydraulic units and to an engine drive shaft during a start mode. The hydraulic control system includes a control valve arrangement, cooperatively coupled to the first and second hydraulic units, and operative in the starting mode to control flow between the hydraulic units, to thereby divide the delivery of rotary power from the generator/motor to the engine drive shaft through the differential and the hydraulic units.

23 Claims, 8 Drawing Figures

AIRCRAFT GENERATOR STARTER-DRIVE

TECHNICAL FIELD

This invention relates to a starter-drive for use between an aircraft engine and a generator/motor to transmit power in either direction.

BACKGROUND ART

Historically, some aircraft engines have been started by devices external to the aircraft, which devices supply torque to accelerate the engine up to its self-sustaining speed within a required time. It has been long recognized that to minimize weight, cost and complexity, it is desirable to utilize equipment already on the aircraft for this purpose. The generating system can be used for engine starting by operating the generator as an electric motor using an external source of electrical energy. Typically, this source of energy is furnished by a ground service cart.

The arrangement just described is generally referred to as a generator-starter drive. The generator-starter drive requires a transmission capable of supplying constant speed to the generator in the normal generating mode as well as supplying torque in the reverse direction to the engine from the generator operating as a motor. The drive employed must allow the motor to come up to its constant operating speed under zero load, and then maintain constant speed while applying accelerating torque to the aircraft engine, which is initially at zero speed.

The Aleem U.S. Pat. No. 3,786,696 is typical of the advancing art involved in starter-drives and discloses in FIG. 1, a starter-drive for use between an aircraft engine and a generator to transmit power in either direction. The Aleem arrangement includes a generator shaft 11, an engine shaft 10, a differential 14 for transmitting power from the engine shaft 10 to the generator shaft 11; a hydrostatic transmission 12, including one hydraulic unit 19 connected for rotation with the generator shaft; a second hydraulic unit 20 connected for rotation with a control gear 26 in the differential; and a first one-way clutch 16 connecting the second hydraulic unit 20 to drive the engine shaft 10 exclusively through the hydrostatic transmission 12 during starting. The Aleem starter-drive is therefore seen to require that all the torque from the generator/motor be delivered through the hydrostatic transmission. This requires that the size of the hydrostatic transmission be sufficient to handle the high starting torques necessary to overcome the inertia of the engine at rest or zero speed. The invention to be described hereinafter provides the same engine starting torques but employs a smaller and lower weight hydrostatic transmission and differential gear.

A more recent advancement in starter-drives is present in the Reynolds et al U.S. Pat. No. 3,274,855, which patent discloses in FIG. 1, a generator 11 drivingly connected through a differential 15' to a variable hydraulic unit 14, a normally fixed hydraulic unit 13 to an engine 10. In this arrangement during the starting mode, the generator 11 can be accelerated to synchronous speed by either short-circuiting the hydraulic lines between the hydraulic units 13, 14 or by varying the displacement of the variable hydraulic unit 14. Torque can then be supplied to the engine by throttling the short circuit in the former case, or by increasing displacement of the variable displacement unit in the latter case. The short-circuiting and throttling method allows both hydraulic units to be at full displacement and therefore, both units to apply maximum torque to the engine.

It is therefore apparent that Reynolds et al, not unlike Aleem, requires that all the torque from the generator/motor be delivered through the hydrostatic transmission 13, 14 with the attendant disadvantages previously noted. These disadvantages are overcome by the invention to be described more fully hereinafter.

DISCLOSURE OF INVENTION

More specifically, this invention relates to a hydraulic control system for an aircraft starter-drive mechanism that includes a generator that can be driven as a motor drivingly connected through a differential, which is mutually connected to first and second hydraulic units and to an engine drive shaft during a start mode. The hydraulic control system includes a control valve arrangement, operatively coupled to the first and second hydraulic units, and operative in the starting mode to control flow between the hydraulic units, to thereby divide the delivery of rotary power from the generator/motor to the engine drive shaft through the differential and the hydraulic units.

It is therefore a principal object of this invention to provide a hydraulic control system for an aircraft generator/starter-drive that allows starting power furnished to the aircraft engine to be divided and cooperatively delivered by a hydrostatic transmission and a mechanical differential.

Another object of the invention is to provide a novel hydrostatic transmission and differential gear arrangement that allows an aircraft generator operated as an electric motor to provide plural torque paths to the aircraft engine to be started.

Yet another object of the invention is to provide an aircraft's starter-drive that incorporates both a hydrostatic transmission and constant speed drive gearing that is smaller and lighter in weight than heretofore known.

In the attainment of the foregoing objects, the invention contemplates in its preferred embodiment, a starter-drive for use between an aircraft engine and a generator/motor to transmit power in either direction that includes a first shaft connectible with the generator/motor and a second shaft connectible with the engine. A differential is provided which has first, second and third elements. The first element is rotatable with the second shaft; the second element and third element are rotatable on the second shaft. A first hydraulic unit is drivingly connected to the first element of the differential and a second hydraulic unit is drivingly connected to the second element of the differential. The first and second hydraulic units are hydraulically interconnected through and controlled by a control valve.

The third element of the differential is drivingly connected through a first one-way clutch to the first shaft for driving the generator/motor in a generating mode, and through a second one-way clutch to the first shaft for driving the engine from the generator/motor in a starting mode.

In a preferred embodiment of the invention, the control valve is operative to dissipate the energy of hydraulic flow between the first and second hydraulic units, while simultaneously operative in the starting mode to cause the first hydraulic unit to maintain maximum displacement, thereby initiating an engine starting torque to the second shaft through the hydraulic units and the differential. When the flow capacity of the second hydraulic unit matches the maximum displacement flow capacity of the first hydraulic unit, the control valve causes the first hydraulic unit displacement to be reduced to zero and thereafter, to a maximum valve in an opposite direction, thereby increasing the speed of the second shaft to the engine while simultaneously reducing torque.

In another embodiment of the invention, the control valve is operative in the starting mode to cause the second hydraulic unit displacement to be increased while simultaneously maintaining the first hydraulic unit at maximum displacement, thereby initiating an engine starting torque on the second shaft exclusively from the first hydraulic unit through the first element of the differential. Thereafter, increased displacement of the second hydraulic unit results in a contribution to engine starting torque acting through the second element of the differential, thereby increasing the starting torque to a maximum value achieved when the second hydraulic unit displacement matches the displacement of the first hydraulic unit. The continued operation of this embodiment is the same as the preferred embodiment once the flow of the second hydraulic unit matches the displacement of the first hydraulic unit.

Other objects and advantages of the present invention will be apparent upon reference to the accompanying description when taken in conjunction with the following drawings:

BEST MODE FOR CARRYING OUT INVENTION

Figure 1:
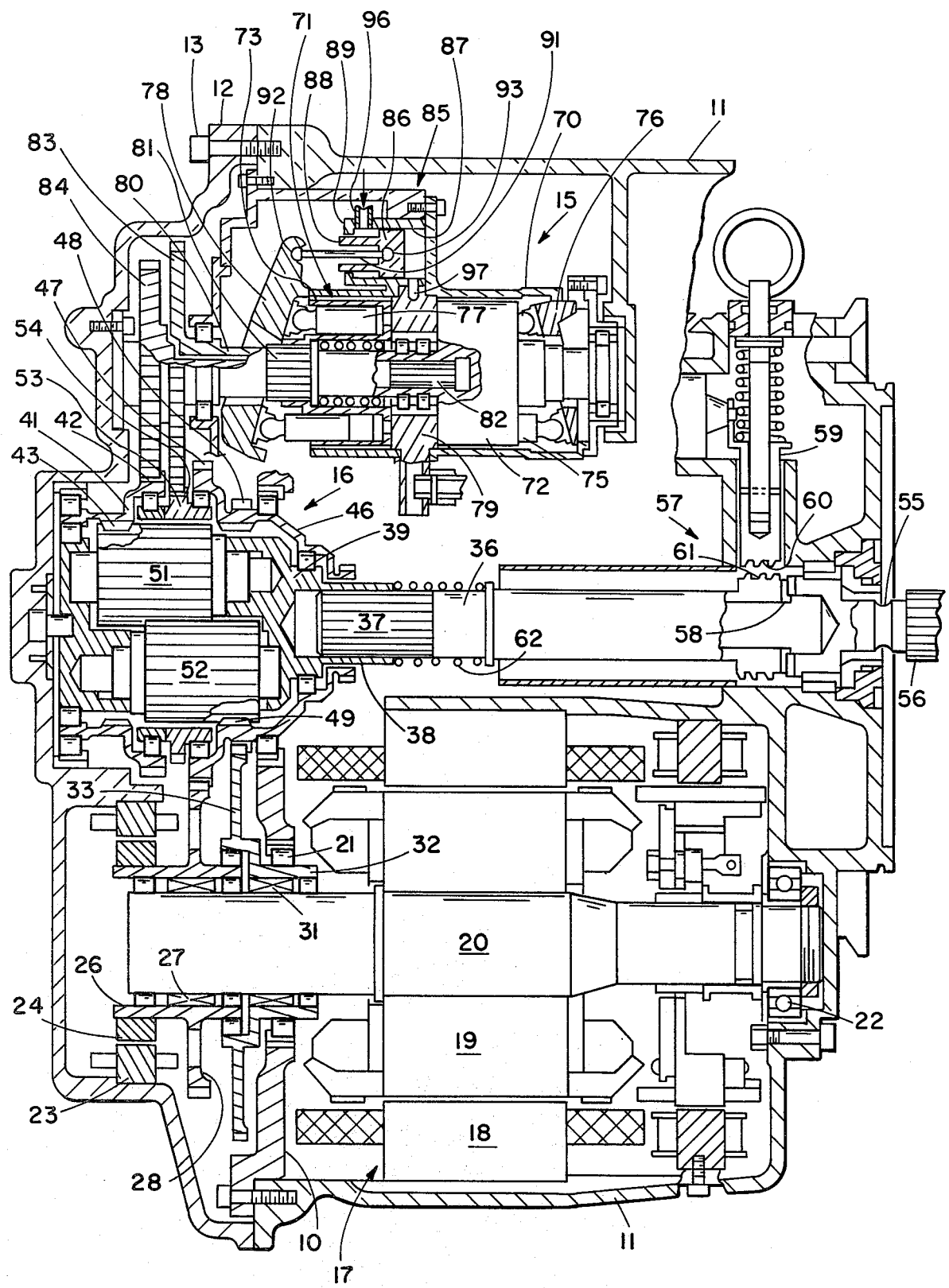
FIG. 1 is a vertical section of the integrated starter-drive generator system embodying the invention.

Reference is now made to FIG. 1, which is a vertical section of the integrated generator starter-drive system embodying the invention. The system includes a number of basic components positioned within a housing 11 which has an end cover 12 secured to the housing 11 by bolts, such as bolt 13. The basic components are a hydrostatic transmission 15, a differential 16 and a generator generally indicated by arrow 17. The generator 17 has a stator 18 secured to the housing 11 and a rotor 19 secured to a generator shaft 20 or first shaft as it is sometimes termed. The generator shaft 20 is mounted on bearings 21, 22 as shown. The bearing 21 is a roller bearing. There are a multitude of similar roller bearings utilized but not referenced. The generator 17 also includes a second stator 23 secured to end cover 12. A rotor 24 is shown secured to a sleeve 26, which sleeve 26 has a first one-way clutch 27 interposed between generator shaft 20 and sleeve 26. The sleeve 26 has secured thereto a gear 28 which cooperates with a differential 16 in a manner to be described hereinafter. One-way clutch 27 provides a drive connection only when the system is in the generating mode. A second one-way clutch 31 is interposed between generator shaft 20 and sleeve 32. The sleeve 32 is rotatably supported on the bearing 21 and housing wall partition 10. The sleeve 32 includes a gear 33 integrally secured thereto. The gear 33 engages a portion of the differential 16 and is driven from the generator shaft 20 through the second one-way clutch 31 during the starting mode. The cooperation of the gear 33, the differential 16 and hydrostatic transmission 15 will be described more fully hereinafter. A drive shaft 36 or second shaft as it is termed, has a splined portion 37 matingly engaged with a sleeve 38, which sleeve 38 is integral with a first element or carrier 39 of the differential 16. The differential 16 is conventional in operation. The differential 16 is comprised of three basic elements, the first element 39, is a carrier which supports mutually meshing planet gears 51, 52. The second element of the differential is made up of ring member 41 which has outer gear teeth 42 and inner gear teeth 43. Inner gear teeth 43 engage planet gear 51. The third element of the differential 16 is fashioned of ring member 46 which has disposed thereon outer gear teeth 47 and 48 and inner gear teeth 49. The inner gear teeth 49 engage planet gear 52. The carrier 39, though not clearly visible in this figure, includes an outer ring element 53 with outer gear teeth 54. The drive shaft 36 receives its drive in the generating mode from a connecting shaft 55 having a splined section 56 located externally of the housing 11 for connection to an output drive from a prime mover, such as an aircraft engine (not shown). Rotation of connecting shaft 55 is imparted to the drive shaft 36 through a quick-disconnect structure, indicated generally at 57, and which is of a type known in the art and shown in a number of patents owned by the assignee of this application.

Generally, the quick-disconnect structure includes a disconnectable clutch 58 between the drive shaft 36 and connecting shaft 55 and a quick-disconnect operator 59 which may be moved from the position shown in FIG. 1 towards the axis of the drive shaft 36 to cause engagement between gear teeth 60, 61 and which causes movement of the drive shaft 36 toward the left, as viewed in FIG. 1 against the action of a spring 62 to release clutch 58 which stops the drive of drive shaft 36. A quick-disconnect structure of this type is shown in Gantzer U.S. Pat. No. 3,365,981 and the disclosure thereof is incorporated herein by reference.

The hydrostatic transmission 15 is shown having hydraulically connected coaxial units. These units are axial piston units. In the preferred embodiment of the invention, one unit is a fixed displacement unit 70, while the other is a variable displacement unit 71. Each of the units is of the same basic structure, including rotatable cylinders 72 and 73, respectively, in which pistons reciprocate under the control of a swashplate. The fixed displacement unit 70 has, for example, piston 75 under the control of a swashplate 76 which is at a fixed angle, while the variable displacement unit 71 has, for example, a piston 77 whose stroke is controlled by a swashplate 78 which is mounted to have its angle varied by hydraulic control structure indicated by arrow 85. The control structure 85 includes a piston 86 mounted for reciprocation in a bore 87. The piston 86 includes an integral tubular skirt 88 which extends as is shown through an opening 89 in the end of a bore 87. The piston 86 is connected to swashplate 78 by means of a dogbone rod 91 with fittings 92, 93 that permit relative movement of swashplate 78 and rod 91 as well as relative angular movement between piston 86 and rod 91. The piston 86 is caused to move by the cooperative relative pressure differentials induced across the piston 86 brought on by the delivery of hydraulic fluid at ports 96, 97. The control of the fluid to the port 97 may be controlled by a governor sensitive hydraulic unit not shown. Accordingly, when the pressure force from port 97 is greater than the pressure force from port 96, the piston 86 moves to the left and causes the rod 91 to move therewith, resulting in a change in angle of swashplate 78. The change in angle of the swashplate 78 varies the displacement of the pump in a known manner. A rotatable cylinder 73 of the unit 71 is connected to a tubular quill shaft 80 which is, in turn, splined to the cylinder 73 as shown at 81. Tubular quill shaft 80 has integral therewith, gear 83, which gear engages external gear 54 of differential 16 carrier member 53. The fixed displacement unit 70 is drivingly connected to an element of the differential 16 through a shaft 82 which is splined to the cylinder 72 of the unit 70 and which extends through the tubular quill shaft 80. The fixed displacement unit 70 with its rotatable cylinder 72 is connected via shaft 82 to gear 84 which gear 84 is drivingly connected to outer gear teeth 42 of ring member 41.

Figure 2:
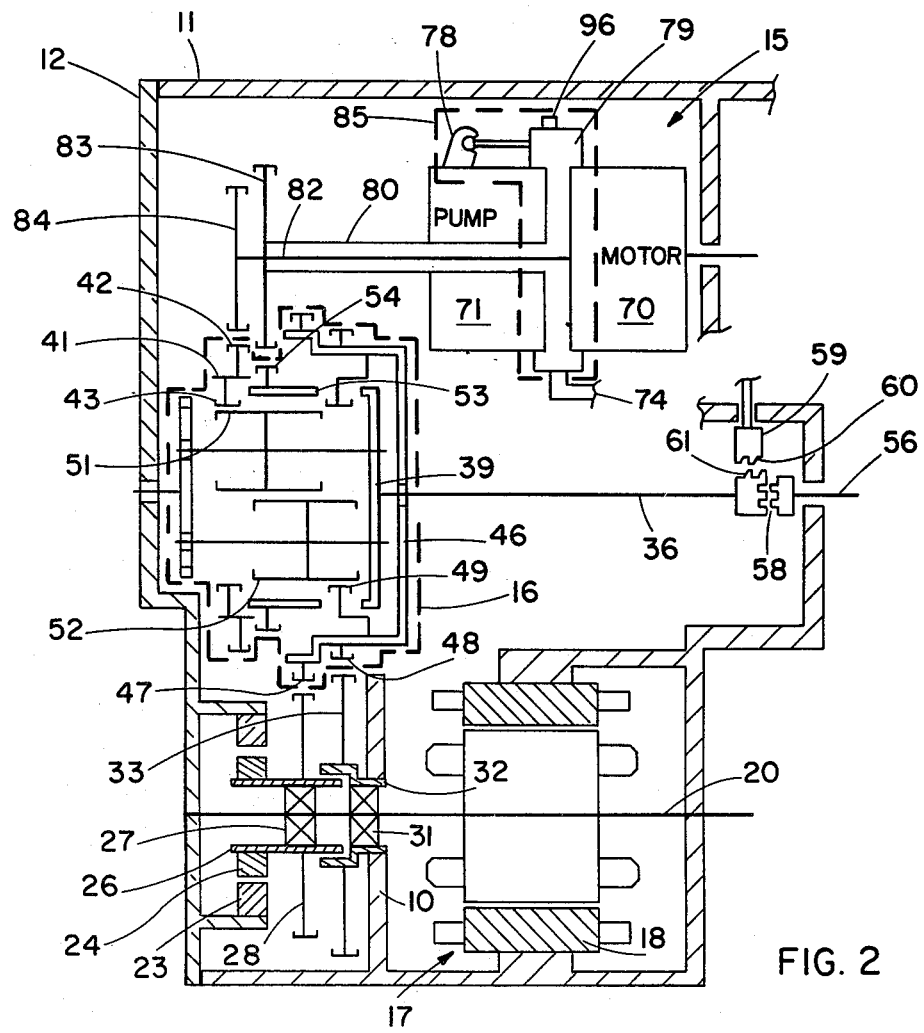
FIG. 2 is a diagrammatic illustration of the mechanical components of the starter-drive embodying the principles of the present invention.

Reference is now made to FIG. 2 in which there is illustrated in diagrammatic form, the mechanical components and hydrostatic units of the starter-drive embodying the principles of the present invention. A description of the mechanical cooperation of the basic elements of the generator starter-drive can be more easily followed in the diagrammatic form of FIG. 2. Accordingly, the mechanical differential 16, here shown in dotted outline, includes three basic elements. As noted earlier, the first element of the differential 16 is represented by carrier 39 secured to drive shaft 36. The second element of the differential 16 is represented by ring member 41, which ring member carries internal gear teeth 43 and external gear teeth 42. The third element of the differential 16 is represented by ring member 46 which carries a pair of external gears 47, 48 and a single internal gear 49. The internal gear 43 of the second element and the internal gear 49 of the third element are shown respectively engaging planet gears 51 and 52 as is shown.

In the generating mode, the differential 16 has four drive connections. The first of these drive connections is from an engine, not shown, through a clutch 58, drive shaft 36 and carrier 39, which carrier is the first element. The second connection is from the fixed displacement 70 via shaft 82, gear 84, outer gear teeth 42 of the second element or ring member 41.

The third connection is from the carrier member 53, which carrier member 53 is integrally secured to and a part of the first element or carrier 39. The carrier member 53 is connected via gear teeth 54, gear 83, tubular quill shaft 80 to variable displacement unit 71. This connection provides a direct input from shaft 36 to the variable displacement unit 71 over the path just described.

The fourth connection for the differential 16 in the generating mode is from the outer gear teeth 47 carried by the third element or ring member 46, gear 28, sleeve 26, and one-way clutch 27 to the generator shaft 20 of generator 17.

With the disclosed structure just described, the speed of the drive shaft 36 can be monitored and, as necessary, the displacement of the variable displacement unit 71 varied, whereby there is established a constant speed of rotation of outer gear teeth 47 carried by the third element or ring member 46. The constant speed of outer gear 47 transmitted, as was described, through the one-way clutch 27 and the shaft 20 of the generator 17, allows the generator 17 to provide a constant frequency output. The structure for monitoring the input speed and controlling the hydrostatic transmission 15 is well known in the art and is not shown.

In the starting mode, the generator is accelerated to synchronous speed, as an induction motor with little or no connected load, in order to limit the internal heating of the generator. Once at synchronous speed, the generator operating as a synchronous motor, delivers power for engine cranking. Accordingly, in the starting mode, the roles of the drive shaft 36 of the generator shaft 20 are reversed. With the generator operated as a motor, shaft 20 provides a driving torque through one-way clutch 31, sleeve 32, gear 33, and outer gear teeth 48 of the third element or ring member 46 of the differential 16. The same reversal of roles also applies to the unit 71 and fixed displacement unit 70. In the start mode, the variable displacement unit 71 is driven by the fixed displacement unit 70 over the same mechanical paths described in respect of the generating mode.

In the description of FIG. 1, reference was made to the hydraulic control structure 85 shown in FIG. 2 in dotted outline. The hydraulic control structure includes the apparatus between the fixed displacement unit 70 and the variable displacement unit 71. The control structure 85 or control valve, as it is sometimes referred to hereinafter, includes a valve plate 79. The valve plate 79 or port plate, as it is sometimes referred to in the art, is a common structure in its operation in detail of construction and is well know in the art. The flow of hydraulic fluid between the variable displacement unit 71 and fixed displacement unit 70 may be short-circuited by the control valve 85 to FIG. 1 and allow unit 70 to rotate without transmitting power to unit 71 or to limit the transfer of power from unit 70 according to the maximum allowable hydraulic working pressure of the hydrostatic transmission. FIG. 2 which illustrate the preferred embodiment, include hydraulic control valve 85 designed to function in what is termed an energy dissipating starting mode. In the energy dissipating starting mode, the hydraulic control valve 85 dissipates the hydraulic flow from the fixed displacement unit 70 at essentially zero hydraulic working pressure, while the generator 17 is being brought up to speed as mentioned earlier. This allows the generator/motor to come up to operating speed with essentially no load. The control valve 85 then functions to dissipate the energy of the flow from the unit 70 at some predetermined value of hydraulic working pressure, with the variable displacement unit 71 held at maximum displacement as is shown in FIG. 1. This produces an initial engine starting torque on the drive shaft 36 through tubular quill shaft 80, gear 83, external gear 54, ring member 53 and first element 39 secured to the drive shaft 36.

For purposes of providing antecedent basis for the description and claims that follow, the generator shaft 20 shall be designated a first shaft, and the drive shaft 36; a second shaft. The variable displacement unit shall be designated a first hydraulic unit, and the fixed displacement unit may be designated a second hydraulic unit.

As the speed of the drive shaft 36 to the engine, not shown, increases from zero, the speed of the variable displacement unit 71 increases proportionately until its hydraulic flow capacity reaches the level where it can accept the full hydraulic flow being produced by the fixed displacement unit 70. At this point in the start mode of operation, energy dissipation ceases as it is no longer necessary to dissipate any of the hydraulic flow from the fixed displacement unit 70. The control valve 85 through movement of dogbone rod 91 causes swashplate 78 to move, which movement causes the reduction of displacement of the variable displacement unit 71 while maintaining the required level of hydraulic working pressure. This reduction in displacement further causes the speed of the drive shaft 36 to the engine to increase. The displacement of the variable displacement unit 71 can be reduced to zero, and then increased to its maximum value in the opposite direction. After going through the zero displacement position just noted, the direction of power-flow through the unit 71 and unit 70 reverses, so that the accelerating torque now comes from the torque produced by the unit 70 acting on the drive shaft 36 through the differential 16, minus the torque being absorbed from the drive shaft 36 by the variable displacement unit 71. Drive shaft speed versus variable hydraulic unit displacement; drive shaft speed versus hydraulic unit speed and drive shaft speed versus torque to the drive shaft 36 are set forth respectively in the graphs of FIGS. 5, 6 and 7.

In the second embodiment of the invention, a variable displacement unit is substituted for the motor as the second hydraulic unit. The operation of the system with the second hydraulic unit as a variable displacement unit will be explained more fully hereinafter.

Figure 1A:
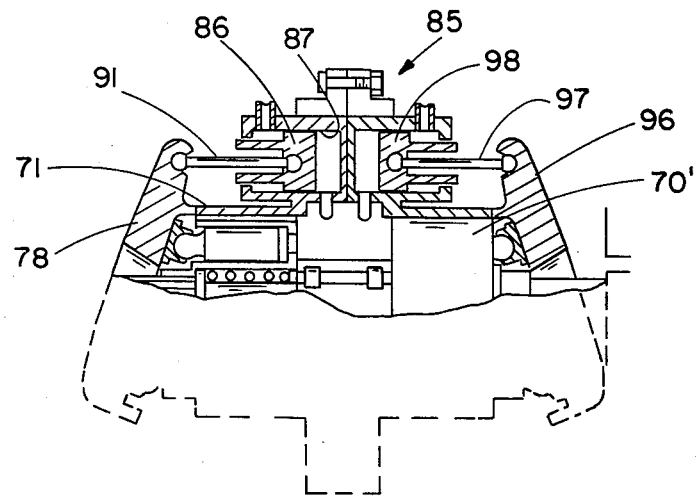
FIG. 1a is a partial section of control valve arrangement for use in a nondissipation start mode of operation.

Reference is now made to FIG. 1a which illustrates a portion of the hydraulic control valve 85 modified in a fashion that will permit replacement of the fixed displacement 70 with a variable displacement unit 70' prime. A comparison of the hydraulic control structure 85, shown in FIG. 1 with that of FIG. 1a, will reveal that there has been a duplication of the swashplate 78 actuating mechanism which includes dogbone rod 91 and piston 86 in bore 87. The structure to the right of center in FIG. 1a is identical in construction and function to that depicted to the left in this figure. Accordingly, there is shown a moveable swashplate 96 connected by dogbone rod 97 and piston 98. Movement of the swashplate 96 is controlled in the same fashion as movement of swashplate 78 described in detail in respect of FIG. 1. It is sufficient to say that swashplate 96 and the displacement of the hydraulic unit 70' may be varied in the same manner as the variable displacement unit 71 is varied.

The incorporation of the hydraulic control valve structure shown in FIG. 1a in the generator starter motor arrangements of FIG. 1 and 2 will allow a starting mode in which there is no energy dissipation. In the non-energy dissipating start mode, the control valve 85 places the variable displacement hydraulic unit 70' at essentially zero displacement while the electric starter motor 17 is being brought up to speed. This allows the generator motor 17 to come up to speed at essentially no load.

The hydraulic control valve 85 of FIG. 1a then begins to cause the increase in displacement of the variable displacement unit 70' from essentially zero, in such a way as to maintain some predetermined level of hydraulic working pressure, while maintaining the variable displacement unit 71 at its maximum displacement. This produces an initial engine starting torque on the drive shaft 36 delivered from the variable hydraulic unit 71, the tubular quill shaft 80, gear 83, outer gear 54, member 53 and thence to first element 39 which is secured to the drive shaft 36. As the displacement of the variable displacement unit 70' increases from zero, its contribution to engine starting torque increases from zero, acting through the differential 16.

When the displacement of the variable displacement unit 70' reaches its maximum value, the hydraulic control valve 85 operates to keep it in this position, and then begins to cause the reduction in the displacement of the variable displacement unit 71, while maintaining the required level of hydraulic working pressure. This further causes the speed of the drive shaft 36 to the engine to increase. From this point on in the brief description that follows, it should be understood that the invention operates in the same fashion without regard to whether the dissipating or non-dissipating start mode is involved. Accordingly, the variable displacement unit 71 can have its displacement reduced to zero and then to a maximum value of displacement in the opposite direction. After going from the zero displacement position, the direction of power flow through the two variable displacement units 70', 71 reverses, so that the engine accelerating torque now comes from the torque delivered by the variable displacement unit 70' acting on the drive shaft 36 through the differential 16, minus the torque being absorbed from the drive shaft 36 by variable displacement unit 71.

Figure 3:
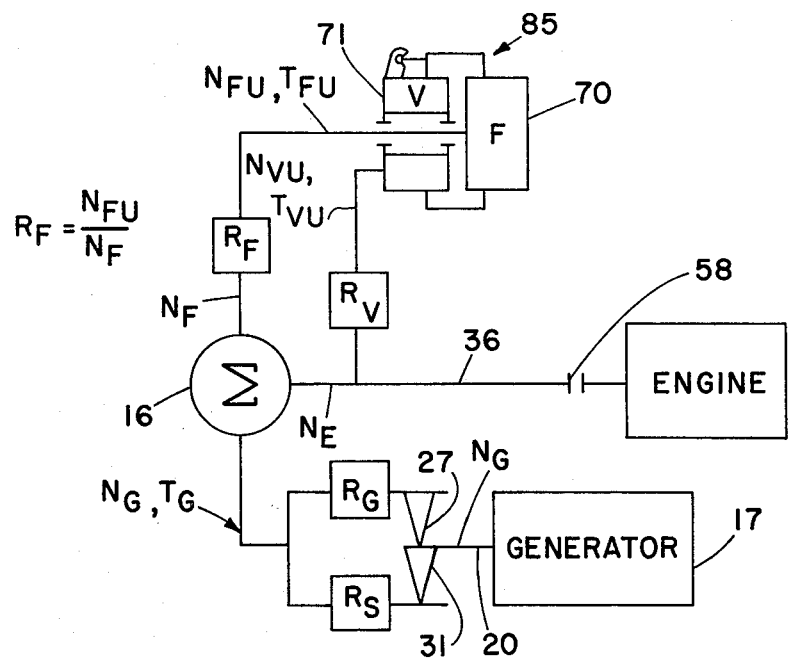
FIG. 3 is a block diagram of the starter-drive system embodying the invention.

Reference is now made to FIG. 3 which presents a further diagrammatic simplification of the generator/starter drive system embodying the invention. The diagram of FIG. 3 should be studied in conjunction with FIGS. 4, 5, 6 and 7. The same reference numerals employed in FIGS. 1 and 2 are utilized in FIG. 3 to identify the same components. In addition to the reference numerals, there are reference characters. The following table will explain the significance of each of the reference characters employed in FIG. 3.

Figure 4:
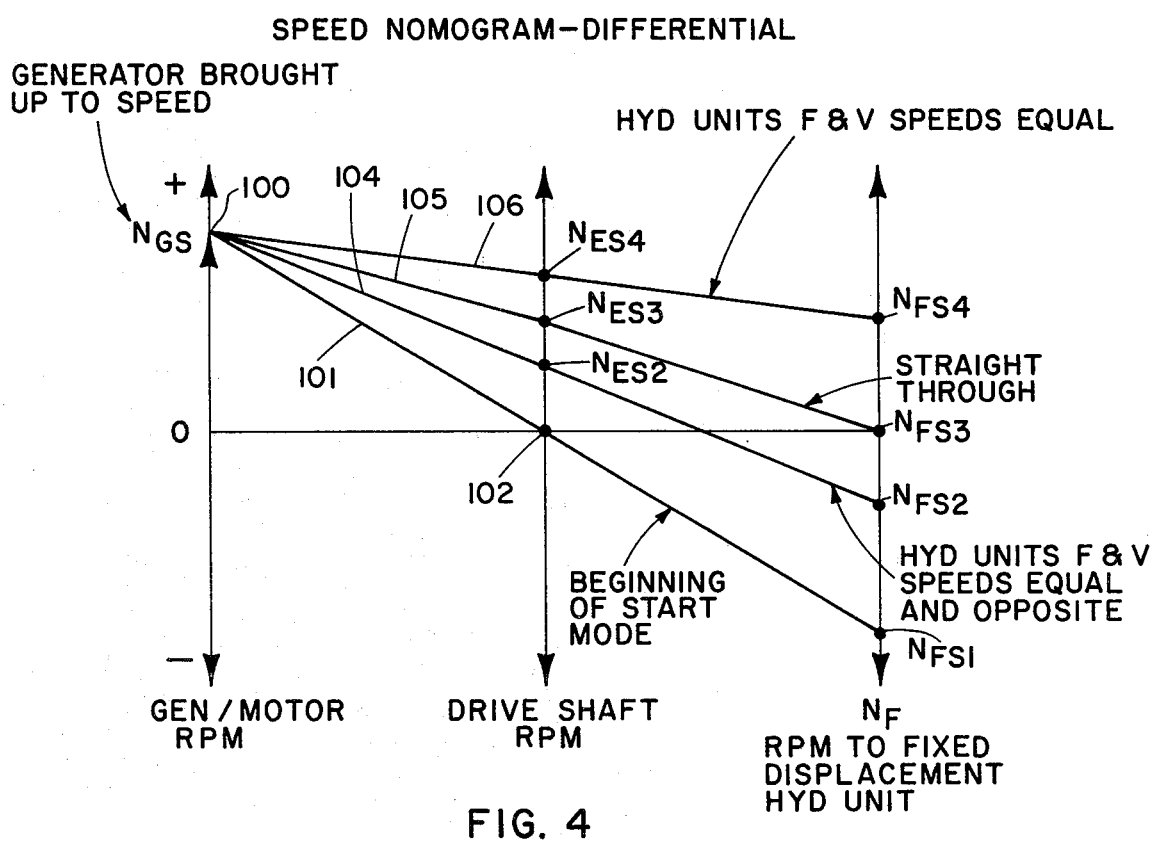
FIG. 4 is a speed nomogram of the differential employed in carrying out the invention in the starting mode.

N = RPM
R = gear ratio
T = torque
V = variable displacement unit
F = fixed displacement unit or motor
U = unit
E = engine
G = generator
S = start mode Reference is now made to FIG. 4 which is a speed nomogram of the differential 16. This speed nomogram includes three separate ordinates. To the left in FIG. 4, the first ordinate represents generator/motor RPM. The middle ordinate represents drive shaft RPM. The third ordinate, located on the far right of FIG. 4, represents RPM to the fixed displacement hydraulic unit. It will be recalled that the generator is initially brought up to speed and then operated as a synchronous motor. Accordingly, the point 100 on the generator/motor RPM ordinate represents the constant RPM of the generator during the starting mode.

It will be further recalled that the drive shaft 36 RPM is equal to the engine RPM, and that the first element of the differential 16 rotates at the same RPM as the drive shaft and the engine. And it should also be additionally recalled that the RPM to the fixed displacement hydraulic unit 70 is directly proportional to the RPM of the second element of the differential 16 designated in FIG. 3 as $N_F$. At the beginning of the start mode, line 101 of the graph having its origin at point 100, extends downwardly to the right and through the zero speed coordinate at point 102, which point 102, represents the fact that the drive shaft 36 has not begun to rotate. The line 101 continues on to the right to a point 103 where it intersects the RPM ordinate of the fixed displacement unit 71. Three additional lines 104, 105 and 106 have been illustrated to demonstrate the relative speeds of the elements of the differential, respectively for three conditions; namely, "hydraulic units F and V speeds equal and opposite," "straight through," and "hydraulic units F and V speeds equal."

Figure 5:
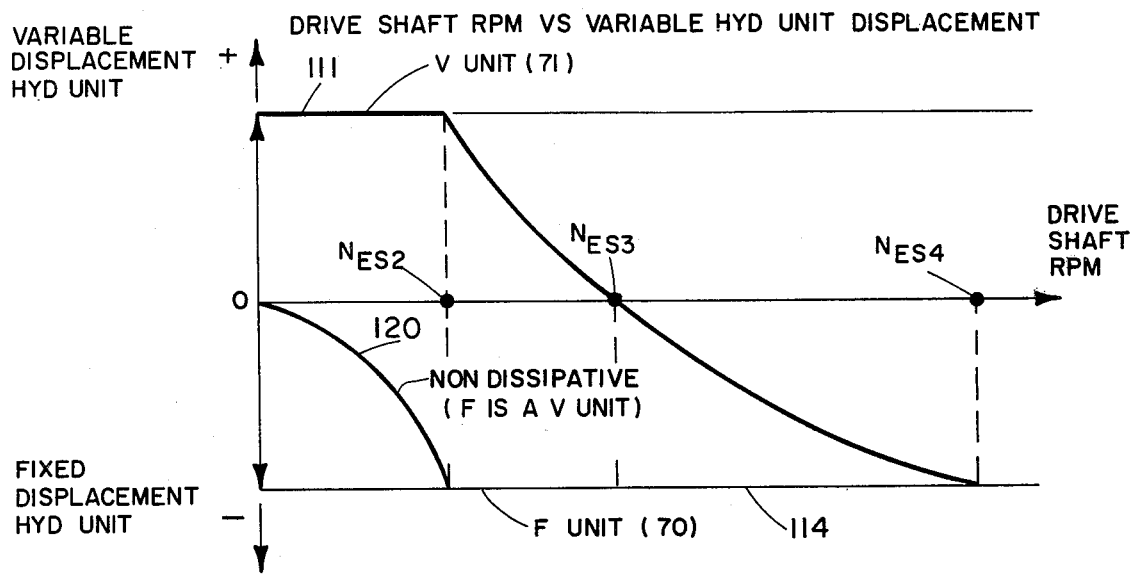
FIG. 5 is a graph of engine speed versus hydraulic unit displacement in the starting mode.

Reference is now made to FIG. 5 which is a graph of drive shaft RPM versus variable hydraulic unit displacement. At zero engine RPM in the nondissipative mode of start, the variable hydraulic unit 71 is indicated by point 110 to be at a maximum displacement. The variable displacement hydraulic unit 71 is shown to remain constant by line 111 until the engine RPM reaches a speed indicated by reference character $N_{ES2}$. The fixed displacement unit 70, as evidenced by line 114, remains constant in its displacement over the entire range of starting engine speeds.

Figure 7:
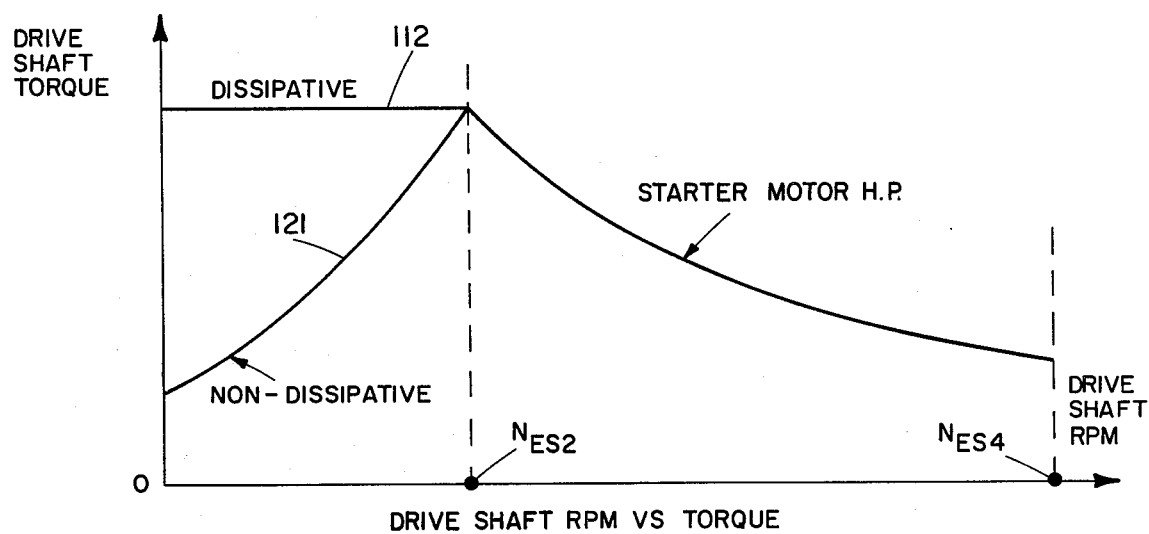
FIG. 7 is a graph of engine speed versus torque in the starting mode.

Reference should now be made momentarily to FIG. 7, which illustrates that from zero drive shaft speed until the speed $N_{ES2}$, initial drive shaft torque is maximum and constant as is indicated by line 112.

Returning to FIG. 5, it will be seen that as the variable hydraulic unit displacement decreases, as is evidenced by curve 113, the drive shaft speed to the engine increases.

FIG. 5 also includes a curve 120 which indicates the conditions present in a nondissipative mode start where the fixed displacement unit has had substituted therefore, a variable displacement unit.

Figure 6:
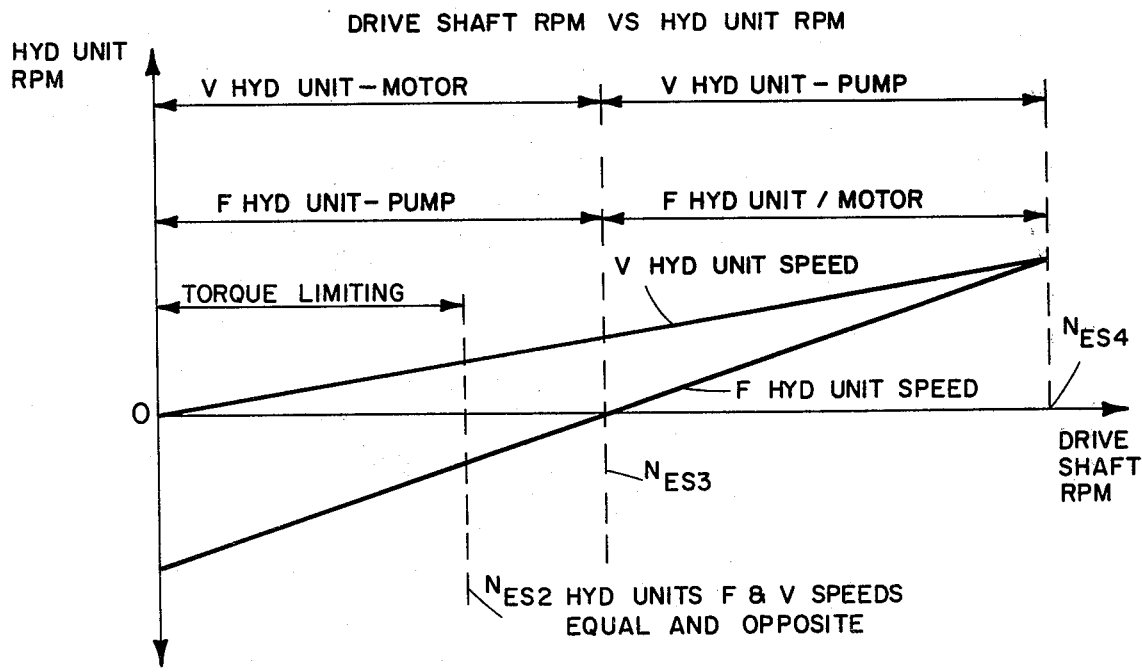
FIG. 6 is a graph of engine speed versus hydraulic unit speed in the starting mode.

FIG. 6 is a graph of engine speed versus hydraulic unit speed and sets forth, graphically, the ranges over which the variable displacement hydraulic unit 71 operates as a motor and then as a pump; and additionally, the range of drive shaft RPM during which the fixed hydraulic unit 70 operates as a pump and then as a motor. A study of FIGS. 6 and 7, in conjunction, reveals that in both the dissipative and nondissipative modes, that the maximum torque limit is reached at drive shaft speed $N_{ES2}$.

FIG. 7 includes a curve 121 which arises during a nondissipative start and shows a gradually increasing torque curve that reaches a maximum when the drive shaft speed reaches $N_{ES2}$.

It can be seen from the preceding description of the invention that the hydraulic control system for the aircraft starter drive mechanism, when compared to the prior art starter-drives that delivered all starting torque through the hydrostatic transmission of the starter-drive, requires only a portion of the engine starter power to be transmitted to the engine through the hydrostatic transmission. As a consequence of this split drive, the hydraulic unit can be smaller in size and weight. In addition to a reduction in size and weight, the efficiency of power transmitted to the engine during start is improved in that there are fewer hydraulic losses present. As a corollary advantage, more of the generator/motor starting power is directly usable and finally, the location of the differential in the output of the constant speed drive coupled with the split power paths described earlier, allows the use of a smaller and lighter weight differential. The reduction in size and weight of the hydraulic units, as well as the employment of a smaller differential, adds up to a substantial savings in weight with a concommitant improved efficiency and starter-drive performance.

Although this invention has been illustrated and described with the particular embodiments illustrated, it will be apparent to those skilled in the art that various changes may be made therein without departing from the spirit of the invention as set forth in the appended claims.

What is claimed is:

1. A hydraulic control system for an aircraft starter-drive mechanism that includes a generator/motor drivingly connected through a differential, which is mutually connected to first and second hydraulic units and to an engine driveshaft during a start mode, said hydraulic control comprising:
    a control valve operatively coupled to said first and second hydraulic units and operative in said starting mode to control flow between said hydraulic units to thereby divide the delivery of rotary power from the generator/motor to said engine driveshaft through said differential and said hydraulic units.

2. The combination of claim 1, wherein said control valve is operative to dissipate the energy of hydraulic flow between said first and second hydraulic units, while simultaneously operative in said starting mode to cause said first hydraulic unit to maintain maximum displacement, thereby initiating an engine starting torque to said second shaft through said hydraulic units and said differential.

3. The combination of claim 2, wherein the cooperation of the control valve and the hydraulic units is such that when the flow capacity of said second hydraulic unit matches the maximum displacement flow capacity of said first hydraulic unit, said control valve causes said first hydraulic unit displacement to be reduced to zero and thereafter, to a maximum value in an opposite direction, thereby increasing the speed of said second shaft while simultaneously reducing torque.

4. The combination of claim 1, wherein said first hydraulic unit is of a variable displacement type.

5. The combination of claim 4, wherein said second hydraulic unit is of a fixed displacement type.

6. The combination of claim 5, wherein said control valve includes means to control the amount of said first hydraulic unit displacement.

7. The combination of claim 4, wherein said second hydraulic unit is of the variable displacement type.

8. The combination of claim 7, wherein said control valve includes means to independently control the amount of both hydraulic units displacement.

9. The combination of claim 1, wherein said control valve is operative in said starting mode to cause said second hydraulic unit displacement to be increased while simultaneously maintaining said first hydraulic unit at maximum displacement, thereby initiating an engine starting torque on said second shaft exclusively from said first hydraulic unit through said first element of said differential, thereafter said second hydraulic unit increased displacement results in a contribution to engine starting torque acting through said second element of said differential, thereby increasing the starting torque to a maximum value achieved when said second hydraulic unit displacement matches the displacement of said first hydraulic unit.

10. The combination of claim 8, wherein the cooperation of the control valve and the hydraulic units is such that when the flow of said second hydraulic unit matches the displacement of said first hydraulic unit, said control valve causes said first hydraulic unit displacement to be reduced to zero and thereafter, to a maximum value in an opposite direction, thereby increasing the speed of said second shaft while simultaneously reducing torque.

11. A starter-drive for use between an aircraft engine and a generator/motor to transmit in either direction, comprising:
  a first shaft connectible with said generator/motor,
  a second shaft connectible with said engine,
  a differential including first, second and third elements, said first element rotatable with said second shaft and said third element rotatable on said second shaft,
  a first hydraulic unit drivingly connected to said first element,
  a second hydraulic unit drivingly connected to said second element,
  said first and second hydraulic units hydraulically interconnected through and controlled by a control valve,
  said third element drivingly connected through a first clutch to said first shaft for driving said generator/motor in a generating mode, and through a second clutch to said first shaft for driving said engine from said generator/motor in a starting mode,
  said control valve operative in said starting mode to control flow between said hydraulic units to thereby divide the delivery of rotary power from the generator/motor to said second shaft and said engine through said differential and said hydraulic units.

12. The combination of claim 11, wherein said first clutch is a one-way clutch.

13. The combination of claim 11, wherein said second clutch is a one-way clutch.

14. The combination of claim 11, wherein said first and second clutches are one-way clutches.

15. The combination of claim 11, wherein said control valve is operative to dissipate the energy of hydraulic flow between said first and second hydraulic units, while simultaneously operative in said starting mode to cause said first hydraulic unit to maintain maximum displacement, thereby initiating an engine starting torque to said second shaft through said hydraulic units and said differential.

16. The combination of claim 15, wherein the cooperation of the control valve and the hydraulic units is such that when the flow capacity of said second hydraulic unit matches the maximum displacement flow capacity of said first hydraulic unit, said control valve causes said first hydraulic unit displacement to be reduced to zero and thereafter, to a maxiumum value in an opposite direction, thereby increasing the speed of said second shaft while simultaneously reducing torque.

17. The combinaton of claim 11, wherein said first hydraulic unit is of the variable displacement type.

18. The combination of claim 14, wherein said second hydraulic unit is of the fixed displacement type.

19. The combination of claim 15, wherein said control valve includes means to control the amount of said first hydraulic unit displacement.

20. The combination of claim 14, wherein said second hydraulic unit is of the variable displacement type.

21. The combination of claim 16, wherein said control valve includes means to independently control the amount of both hydraulic units displacement.

22. The combination of claim 11, wherein said control valve is operative in said starting mode to cause said second hydraulic unit displacement to be increased while simultaneously maintaining said first hydraulic unit at maximum displacement, thereby initiating an engine starting torque on said second shaft exclusively from said first hydraulic unit through said first element of said differential, thereafter said second hydraulic unit increased displacement results in a contribution to engine starting torque acting through said second element of said differential, thereby increasing the starting torque to a maximum value achieved when said second hydraulic unit displacement matches the displacement of said first hydraulic unit.

23. The combination of claim 18, wherein the cooperation of the control valve and the hydraulic units is such that when the flow of said second hydraulic unit matches the displacement of said first hydraulic unit, said control valve causes said first hydraulic unit displacement to be reduced to zero and thereafter, to a maximum value in an opposite direction, thereby increasing the speed of said second shaft while simultaneously reducing torque.

* * * * *